United States Patent
Fukuda et al.

(10) Patent No.: US 7,462,918 B2
(45) Date of Patent: Dec. 9, 2008

(54) PRESSURE SENSOR HAVING GOLD-SILICON EUTECTIC CRYSTAL LAYER INTERPOSED BETWEEN CONTACT LAYER AND SILICON SUBSTRATE

(75) Inventors: Tetsuya Fukuda, Niigata-ken (JP); Katsuya Kikuiri, Niigata-ken (JP); Yoshinobu Nakamura, Niigata-ken (JP); Shigeaki Yamauchi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/680,970

(22) Filed: Mar. 1, 2007

(65) Prior Publication Data

US 2007/0205474 A1  Sep. 6, 2007

(30) Foreign Application Priority Data

Mar. 2, 2006 (JP) .............................. 2006-056844
Mar. 14, 2006 (JP) .............................. 2006-069713

(51) Int. Cl.
*H01L 21/76* (2006.01)

(52) U.S. Cl. ................... 257/417; 257/415; 257/414; 257/E29.324; 438/52; 438/48; 73/724

(58) Field of Classification Search ......... 257/414–419; 438/48–52; 73/724
See application file for complete search history.

(56) References Cited

U.S. PATENT DOCUMENTS

| 4,314,225 A * | 2/1982 | Tominaga et al. ............... 338/4 |
| 2003/0056598 A1 * | 3/2003 | Kimura et al. ................. 73/754 |

FOREIGN PATENT DOCUMENTS

JP  8-075582  3/1996

\* cited by examiner

*Primary Examiner*—Dung A. Le
(74) *Attorney, Agent, or Firm*—Brinks Hofer Gilson & Lione (57) ABSTRACT

A pressure sensor includes a gold-silicon eutectic crystal layer interposed between the contact layer and the silicon substrate. Because the contact layer and the silicon substrate are electrically connected to each other by using a gold-silicon eutectic reaction at the time of bonding the silicon substrate and the glass substrate, a contact resistance between the contact layer and the silicon substrate can be stabilized, and a Q value of the sensor can be stabilized. In addition, since the contact layer and the silicon substrate are bonded to each other by the gold-silicon eutectic reaction, the bonding strength is sufficient.

7 Claims, 8 Drawing Sheets

MEASUREMENT PRESSURE

PRESSURE SENSOR HAVING GOLD-SILICON EUTECTIC CRYSTAL LAYER INTERPOSED BETWEEN CONTACT LAYER AND SILICON SUBSTRATE

This application claims the benefit of priority under 35 U.S.C. §119 to Japanese Patent Application Nos. 2006-056844 filed on Mar. 2, 2006 and 2006-069713 filed on Mar. 14, 2006, both which are incorporated by reference in their entirety.

BACKGROUND OF THE INVENTION

1. Field of the Invention

The present invention relates to a pressure sensor for sensing pressure, and more particularly, to a capacitive pressure sensor for sensing pressure by using electrostatic capacitance.

2. Description of the Related Art

A capacitive pressure sensor is formed by bonding a substrate having a pressure-sensitive diaphragm, which is a movable electrode, and a substrate having a fixed electrode with a gap (cavity) between the pressure-sensitive diaphragm and the fixed electrode. When pressure is applied to the pressure-sensitive diaphragm, the pressure-sensitive diaphragm is deformed and the gap between the pressure-sensitive diaphragm and the fixed electrode is varied. Electrostatic capacitance between the pressure-sensitive diaphragm and the fixed electrode varies with the variation of the gap. Accordingly, a variation in pressure is sensed by using the variation of the electrostatic capacitance.

Figure 5:
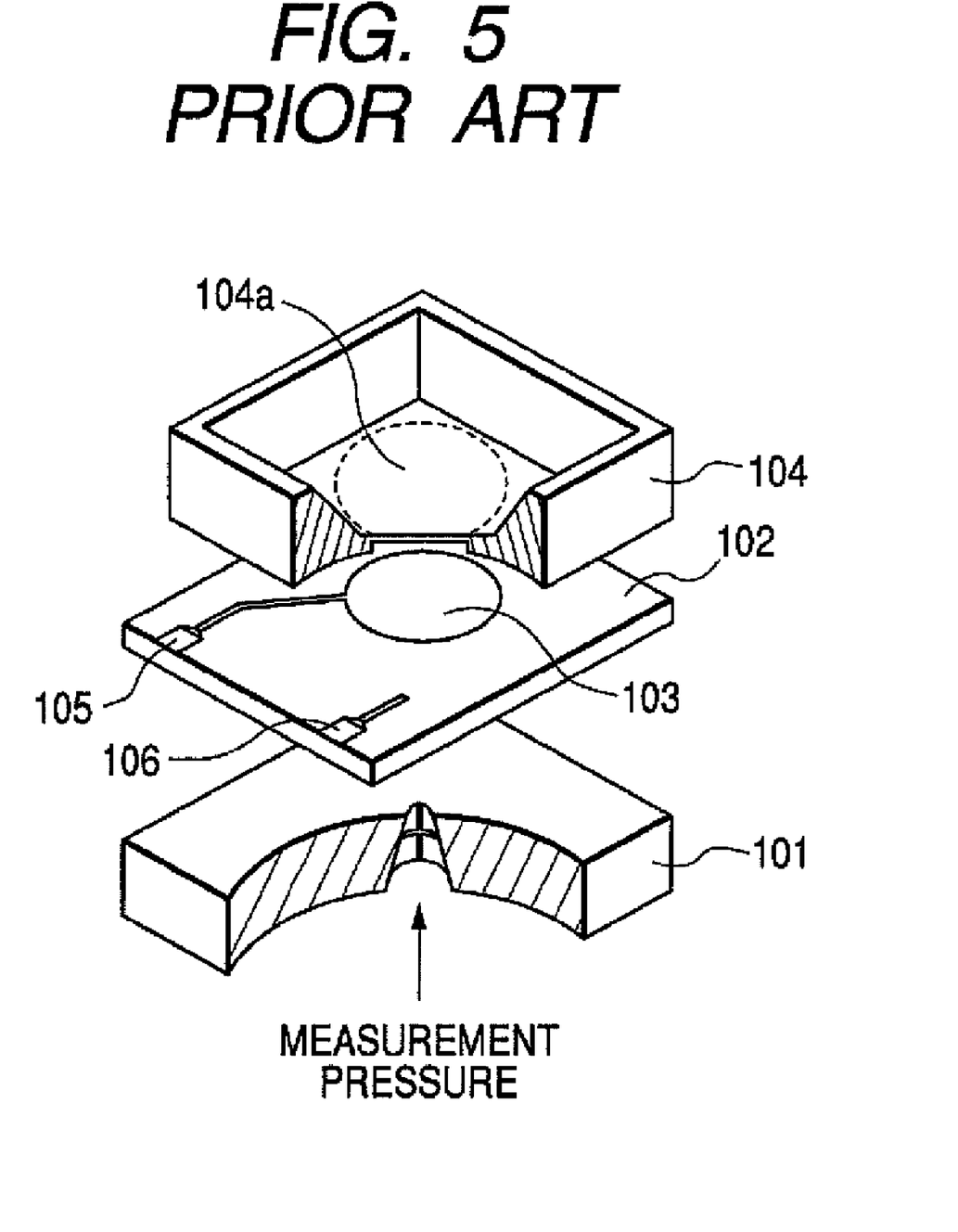
FIG. 5 is a sectional view illustrating a known capacitive pressure sensor.

For example, in the capacitive pressure sensor, as shown in FIG. 5, a glass substrate 102 having a fixed electrode 103 is disposed on a supporting substrate 101. A silicon substrate 104 having a diaphragm 104a is bonded to the glass substrate 102. In such a capacitive pressure sensor, since an extraction electrode 105 for the fixed electrode 103, and an extraction electrode 106 for the movable electrode (diaphragm 104a) are patterned on the glass substrate 102, the extraction electrodes are disposed in a bonded area between the glass substrate 102 and the silicon substrate 104. An example of such a capacitive pressure sensor is disclosed in However, in such a structure, the extraction electrodes 105 and 106 exist in the bonded area between the glass substrate 102 and the silicon substrate 104. Accordingly, in the extraction electrode 105 and 106, when the glass substrate 102 and the silicon substrate 104 are not properly bonded to each other, the cavity between the glass substrate 102 and the silicon substrate 104 is not sufficiently airtight. As a result, the diaphragm 104a does not serve as the movable electrode and the sensor dies not operate properly. When the glass substrate 102 and the silicon substrate 104 are not properly bonded to each other in the extraction electrodes 105 and 106, a contact resistance becomes unstable and a Q value of the sensor is not uniform.

SUMMARY OF THE INVENTION

It is an object of the present invention to provide a capacitive pressure sensor capable of exhibiting a satisfactory sensor characteristic with a sufficient bonding strength between substrates even when an extraction electrode exists in a bonded area between the substrates.

The capacitive pressure sensor includes: a glass substrate having a fixed electrode; a silicon substrate having a movable electrode; a bonded area between the glass substrate and the silicon substrate; an extraction electrode formation area on the glass substrate for the movable electrode; a contact layer extending from the bonded area to the extraction electrode formation area; and a gold-silicon eutectic crystal layer provided between the contact layer and the silicon substrate in the bonded area.

According to the configuration, since the gold-silicon eutectic crystal layer is interposed between the contact layer and the silicon substrate, that is, since the contact layer and the silicon substrate are electrically connected to each other by using a gold-silicon eutectic reaction at the time of bonding the silicon substrate and the glass substrate, a contact resistance between the contact layer and the silicon substrate can be stabilized, a Q value of the sensor can be stabilized, and satisfactory sensor characteristics can be obtained. In addition, since the contact layer and the silicon substrate are bonded to each other by the gold-silicon eutectic reaction, the bonding strength is sufficient.

In the capacitive pressure sensor of the invention, it preferable that the bonded area has a recess portion, and the contact layer is formed on the recess portion. According to the configuration, since the glass substrate can absorb a thickness by the contact layer, the silicon substrate and the glass substrate can be bonded to each other well.

In the capacitive pressure sensor of the invention, a depth of the recess portion is set so that the glass substrate and the contact layer are flush with each other when the contact layer is formed in the recess portion. According to the configuration, since the bonded area between the glass substrate and the contact layer can be flat and only a gold layer which is contributing to a gold-silicon eutectic crystal reaction can be allowed to protrude, the gold-silicon eutectic crystal layer reaction can be formed. As a result, the bonding strength between the silicon substrate and the glass substrate can be increased.

In the capacitive pressure sensor of the invention, it is preferably that the gold layer is formed on the extraction electrode formation area of the contact layer in a state where the gold layer is separated from the gold-silicon eutectic crystal layer. According to the configuration, it is possible to prevent the gold layer from being affected by the gold-silicon eutectic reaction in the bonded area.

The capacitive pressure sensor includes: the glass substrate having the fixed electrode; the silicon substrate having the movable electrode so as to form a cavity; a bonded area between the glass substrate and the silicon substrate; the extraction electrode formation area on the glass substrate of the movable electrode, the contact layer protruding from the bonded area to the extraction electrode formation area; and the gold-silicon eutectic crystal layer provided between the contact layer and the silicon substrate in the bonded area. A distance from an outer end portion of a non-bonded area which is formed in the bonded area to an end portion of the cavity, is 150 µm or more, and a height of the contact layer protruding from a surface of the glass substrate is 3000 Å or less.

According to the configuration, since the distance from the outer end portion of the non-bonded area which is formed in the bonded area between the glass substrate and the silicon substrate to an end portion of the cavity, is 150 µm or more. The glass substrate and the silicon substrate are bonded to each other well, thereby providing an excellent sensor. Since the height of the contact layer protruding from the surface of the glass substrate is 3000 Å or less in the bonded area, the silicon substrate and the glass substrate are bonded to each other well, and the movable electrode varies in accordance with the pressure. For this case, since the gold-silicon eutectic reaction is performed at the time of bonding the silicon substrate and the glass substrate, a contact resistor between the contact layer and the silicon substrate is stabilized. Accordingly, the Q value of the sensor is stabilized and satisfactory sensor characteristics can be obtained. Since the contact layer and the silicon substrate are bonded by the gold-silicon eutectic reaction, the bonding strength is sufficient.

In the capacitive pressure sensor of the invention, it preferably that the bonded area has the recess portion, and the contact layer is formed on the recess portion. According to the configuration, since the glass substrate can absorb a thickness by the contact layer, the silicon substrate and the glass substrate can be bonded to each other well.

In the capacitive pressure sensor of the invention, it is preferable that an interface between the glass substrate and the silicon substrate has either an Si—Si bond or a Si—O bond. According to the configuration, since the silicon and the glass are well-bonded to each other and the interface therebetween exhibits a high adhesion, airtightness in the cavity can be improved.

According to the capacitive pressure sensor of the invention, the capacitive pressure sensor, which is formed by bonding the glass substrate having the fixed electrode and the silicon substrate having the movable electrode, in which the silicon substrate includes the extraction electrode formation area for the movable electrode, includes the contact layer extending from the bonded area between the glass substrate and the silicon substrate to the extraction electrode formation area and the gold-silicon eutectic crystal layer provided between the contact layer and the silicon substrate in the bonded area. Accordingly, even when the extraction electrode exists in the bonded area between substrates, the bonding strength is sufficient between the substrates and satisfactory sensor characteristics can be obtained. The capacitive pressure sensor of the invention which is formed by bonding the glass substrate having the fixed electrode and the silicon substrate having the movable electrode so as to form a cavity, includes the contact layer protruding from the bonded area between the glass substrate and the silicon substrate and the gold-silicon eutectic crystal layer provided between the contact layer and the silicon substrate in the bonded area. Since the distance from the outer end portion of the non-bonded area, which is formed in the bonded area to the end portion of the cavity, is 150 µm or more, and the height of the contact layer protruding from the plane of the glass substrate is 3000 Å or less, even when the extraction electrode existed in the bonded area between the substrates, the bonding strength is sufficient and satisfactory sensor characteristics can be obtained between the substrates.

BRIEF DESCRIPTION OF THE DRAWINGS

FIG. 1 is a schematic view illustrating a configuration of a capacitive pressure sensor according to a first embodiment, where

FIG. 6 is a schematic diagram showing a configuration of a capacitive pressure sensor, where

DESCRIPTION OF THE PREFERRED EMBODIMENT

Hereinafter, embodiments of the invention will be described with the accompanying drawings.

First Embodiment

Figure 1A:
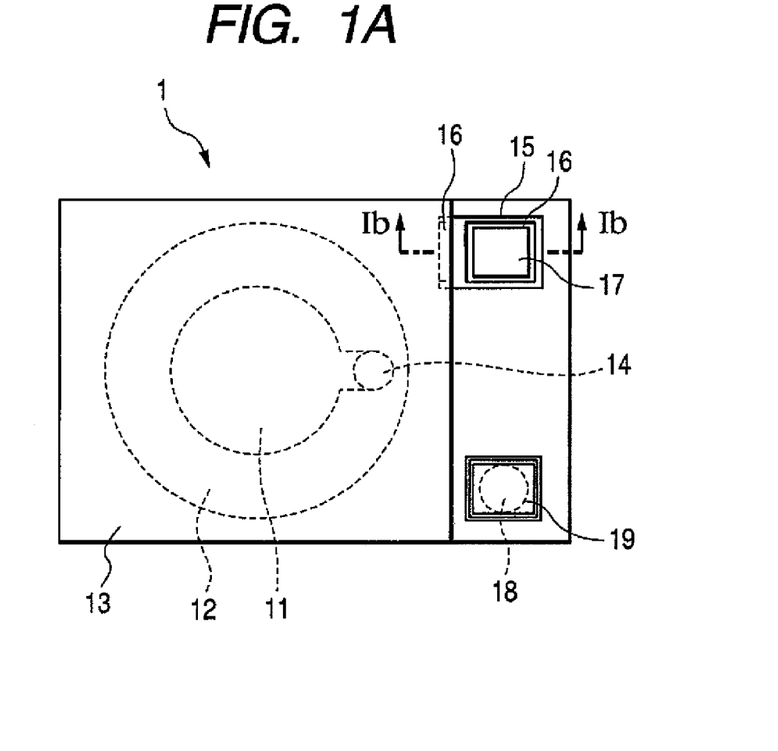
FIG. 1A is a plan view and FIG. 1B is a sectional view taken along Line Ib-Ib of FIG. 1A.
Figure 1B:
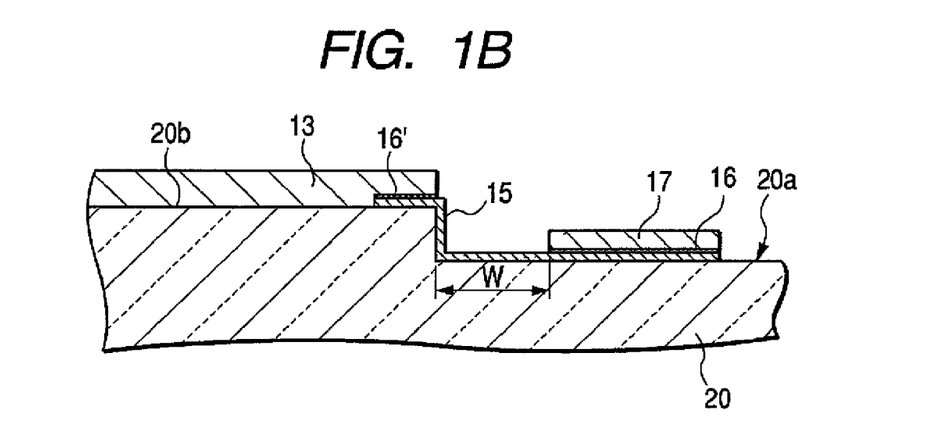

FIG. 1 is a diaphragm illustrating a capacitive pressure sensor according to an embodiment of the invention, where FIG. 1A is a plan view and FIG. 1B is a sectional view taken along Line Ib-Ib of FIG. 1A.

The capacitive pressure sensor 1 as shown in FIG. 1A is formed by bonding a glass electrode 20 having a fixed electrode 11, and a silicon substrate 13 having a diaphragm which is a movable electrode. A cavity 12 which is a movable area of the diaphragm is formed between the glass substrate 20 and the silicon substrate 13.

Around the cavity area 12, an electrode pad 17 if formed, which is an extraction electrode of the movable electrode. Also, an electrode pad 19, which is the extraction electrode of the extraction electrode 11, is formed around the cavity area. The electrode pad 17 for the movable electrode is electrically connected to the silicon substrate 13 having the movable electrode with a contact layer 15 interposed therebetween. The electrode pad 19 for the fixed electrode is connected to the fixed electrode 11 with a contact pins 14 and 18 interposed therebetween.

FIG. 1B is a diagram illustrating a connection state between the silicon substrate 13 and the electrode pad 17. As shown in FIG. 1B, the glass substrate 20 includes an electrode formation area 20a forming the electrode pad 17, and a bonded area 20b bonding the silicon substrate 13. Herein, a bump is provided on the glass substrate 20, and the bonded area 20b is provided at an upper position, and the electrode formation area 20a is provided at a lower position. However, the configuration may not be limited thereto.

On the substrate 20, a contact layer 15 extends from the electrode formation area 20a to the bonded area 20b. Accordingly, the contact layer 15 is bonded to the silicon substrate 13 in the bonded area 20b, and the electrode pad 17 is formed on the electrode formation area 20a in an upper part. Accordingly, the silicon substrate 13 having the movable electrode is electrically connected to the electrode pad 17 with the contact layer 15 interposed therebetween. The contact layer 15 is formed of a metal which has a good adhesion with glass, such as Ti, Cu, Cr, and so on, which may be scattered on the silicon. In addition, it is preferable that a thickness of the contact layer 15 is in the range of 100 mm to 300 mm by utilizing electric conduction characteristics, a gold-silicon eutectic reaction, and an anode bonding characteristic, and the like.

The silicon substrate 13 is formed on the glass substrate 20 with the contact layer 15 interposed therebetween in the bonded area 20b. The gold-silicon eutectic crystal layer 16' is formed on the contact layer 15. The gold-silicon eutectic crystal layer 16' can be formed at the time of bonding the silicon substrate 13 and the glass substrate 20. For example, in parallel with the anode bonding, the eutectic reaction by gold of the gold-seed layer 16 formed on the contact layer 15, and silicon (of the silicon substrate 13), effect the gold silicon eutectic silicon. The gold-silicon eutectic crystal layer 16' serves to prevent an oxidation in a surface of the contact layer 15.

Accordingly, since the gold-silicon eutectic crystal layer 16' is interposed between the contact layer 15 and the silicon substrate 13, that is, since the contact layer 15 and the silicon substrate 13 are electrically connected to each other by using a gold-silicon eutectic reaction at the time of bonding the silicon substrate 13 and the glass substrate 20, a contact resistance between the contact layer 15 and the silicon substrate 13 can be stabilized, and a Q value of the sensor can also be stabilized. Thus the sensor has satisfactory characteristics. In addition, since the contact layer 15 and the silicon substrate 13 are bonded to each other by the gold-silicon eutectic reaction, the bonding strength is sufficient.

The gold-seed layer 16 is formed on the contact layer 15 of the electrode formation area 20a. The gold-seed layer 16 is formed in a state where the gold-silicon eutectic crystal layer 16' is separated from the gold-seed layer 16. Since the gold-seed layer 16 does not affect the gold-silicon eutectic crystal layer in the bonded area, it is preferable that the gold-seed layer 16 and the gold-silicon eutectic crystal layer 16' are separated from each other by a sufficient distance W. For example, the distance W is in the range of 10 µm to 200 µm. It is possible to prevent the gold-seed layer 16 from being affected by the gold-silicon eutectic reaction in the bonded area. The gold-seed layer 16 serves as a plating seed layer. A material forming the seed layer can be varied appropriately by the material forming the electrode pad on the seed layer by considering the contact resistance.

An electrode pad 17 is formed on the gold-seed layer 16. The electrode pad 17 can be electrically connected to an external circuit such as by a wire bonding, and so on. Formation of the electrode pad 17 is determined based upon the materials forming the seed layer and materials forming the electrode pad 17. The structure of the electrode formation area is not limited to the structure disclosed, and may vary in form.

It is preferable that an interface between the silicon substrate 13 and the glass substrate 20 has the high adhesion. At the time of bonding the silicon substrate 13 to the glass substrate 20, the adhesion can be increased between the substrates 13 and 20 by mounting the silicon substrate 13 in the anode bonding manner on a bonded surface of the glass substrate 20. Accordingly, airtightness in the cavity 12 can be enhanced by exhibiting the high adhesion on the interface between the glass substrate 20 and the silicon substrate 13.

Herein, an anode bond process utilized a large electrostatic attraction between the silicon and the glass, by applying a predetermined voltage (for example, 300 V~1 kV) at a predetermined temperature (for example, 400° C. or less). A chemical bond where oxygen is interposed between a contacted glass-silicon interface is formed, or a covalent bond where oxygen is emitted is formed. The covalent bond on the interface is a Si—Si bond or a Si—O bond, which is included in an Si atom of the silicon and the glass between Si atoms. Accordingly, the silicon and the glass are bonded strongly by the Si—Si bond, or the Si—O bond, and a high adhesion is exhibited in the interface.

In order to perform such an anode bonding efficiently, it is preferable that a glass material of the glass substrate 20 include an alkali metal, such as sodium, and the like (e.g. Pyrex glass, which is a Registered Trademark of Corning Glass Corporation).

The capacitive pressure sensor having such a configuration exhibits a predetermined electrostatic capacitance between the diaphragm (the movable electrode) and the fixed electrode 11. When pressure is applied to the pressure sensor, the diaphragm is movable by the pressure. Accordingly, the diaphragm moves or shifts, and the electrostatic capacitance between the diaphragm and the fixed electrode 11 varies. Accordingly, the variation can be converted into a pressure variation by using the electrostatic capacitance as a parameter.

Figure 2A:
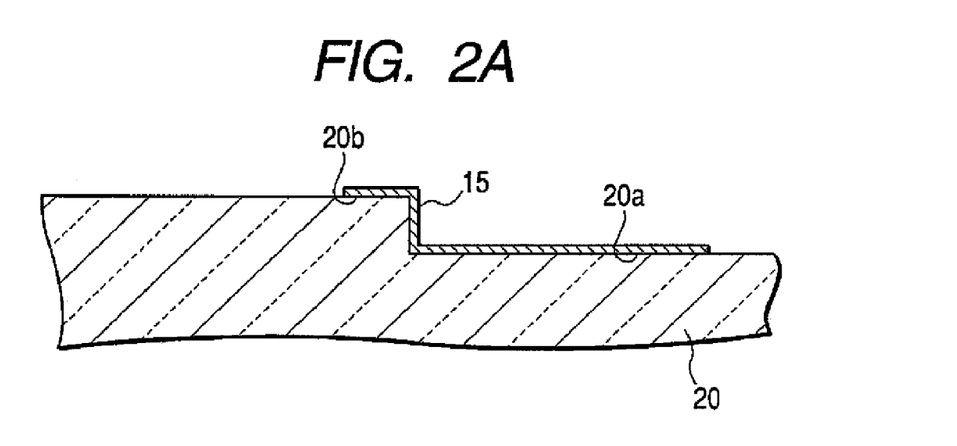
FIGS. 2A to 2C are sectional views illustrating a method of manufacturing a capacitive pressure sensor according to the first embodiment of the invention.
Figure 2B:
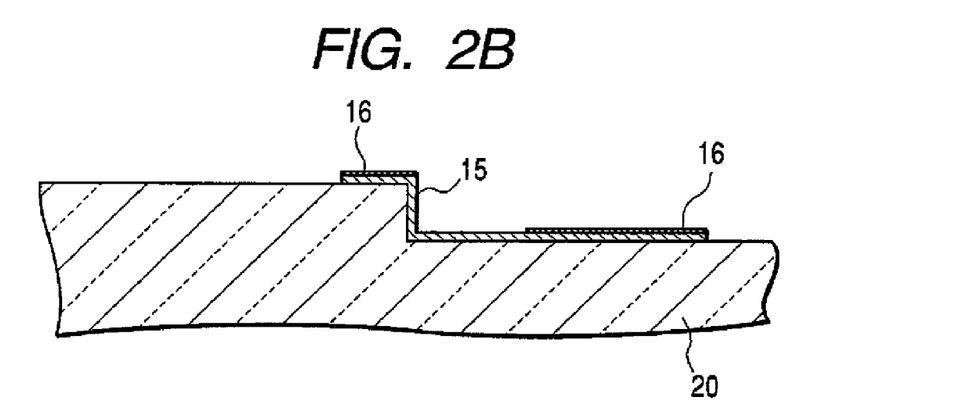
Figure 2C:
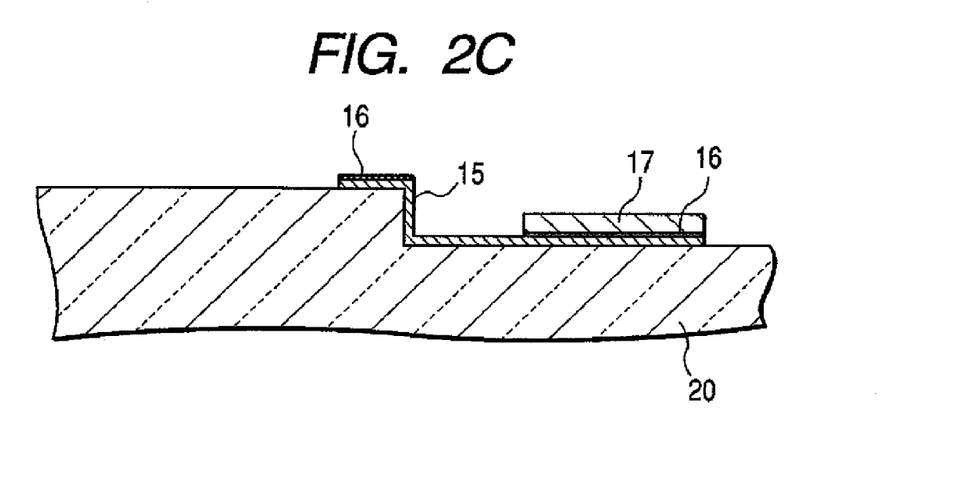

Next, a method of manufacturing the capacitive pressure sensor of the first embodiment will be described. FIGS. 2A to 2C are sectional views illustrating the method of manufacturing the capacitive pressure sensor according to the first embodiment.

The capacitive pressure sensor can be manufactured having a buried substrate burying a conductive portion of the silicon to the glass substrate, and a recess portion formed in the buried substrate for the cavity and the fixed electrode. Specifically, a protrusion portion is formed by etching a main direction of the silicon substrate, which is subjected to a low resistance. The glass substrate is placed in the protrusion portion, the silicon substrate or the glass substrate is heated in a vacuum, the silicon substrate is pressed on the glass substrate, the protrusion portion is pressed into the glass substrate, and then the silicon substrate and the glass substrate are bonded to each other. By performing a grinding process of the glass substrate and the silicon substrate, and exposing the protrusion portion in both sides of the glass substrate, the buried substrate is manufactured in which the conductive portion is buried in the glass substrate. Then, the fixed electrode is formed by forming the recess portion for the cavity in the buried substrate.

As shown in FIG. 2A, from the electrode formation area 20a of the glass substrate 20 to the bonded area 20b, the contact layer 15 is formed along the bump. Accordingly, a resist film is formed on the glass substrate 20 and the resist film is patterned to open the contact layer formation area. A material forming the contact layer 15 is deposited by a sputtering technique, and the like, and then the resist film is removed (lifted off).

Accordingly, as shown in FIG. 2B, the gold-seed layer 16 is formed in a state where the gold-seed layer 16 is separated from the contact layer 15. For this case, the resist film is formed in the area including the contact layer 15, and the resist film is patterned to open the gold-seed layer formation area. The material forming the gold-seed layer 16 is deposited by the sputtering technique, and the resist film is removed (lifted off). Accordingly, the electrode pad 17 is formed on the gold-seed layer 16 by the plating.

As shown in FIG. 2C, an electrode pad 17 is formed on a gold-seed layer 16. In this case, a mask is provided on an area around the electrode pad formation area and only the electrode pad formation area is plated to form an electrode pad 17. Also, a condition of the plating is generally a used condition although the condition may be varied according to material. Accordingly, the resist film is formed on the entire surface and is patterned (photo-lithography) so that the resist film remains around the electrode pad. Accordingly, the resist film is employed as the mask to etch the gold-seed layer 16 and the contact layer 15, and the remaining resist film is removed.

Accordingly, a silicon substrate 13 which is formed in a predetermined thickness of several tens of micrometers by the etching or the grinding, is bonded on the glass substrate 20 by allowing the diaphragm (the movable electrode) to be placed at an interval of a predetermined gap. Accordingly, the anode bonding process is carried out by applying voltage of about 500 V to the silicon substrate 13 and the glass substrate 20, and heating the substrates at a temperature of 400° C. or less. The adhesion at the interface between the silicon substrate 13 and the glass substrate 20 is increased so that the airtightness of the cavity 12 can be improved. Accordingly, for the gold-seed layer 16 between the contact layer 15 and the silicon substrate 13 in the bonded area 20b, by the gold-silicon eutectic reaction of the gold of the gold-seed layer 16 and the silicon of the silicon substrate 13 is converted into the gold-silicon eutectic crystal layer 16'. Accordingly, the capacitive pressure sensor can be produced.

In the capacitive pressure sensor according to the above-mentioned process, the fixed electrode 11 is electrically connected to the electrode pad 19 with contacts pins 14 and pin 18 interposed therebetween, and the diaphragm is electrically connected to the electrode pad 17 with the contact layer 15 interposed therebetween. Accordingly, a signal representing the variation of the electrostatic capacitance sensed between the diaphragm and the fixed electrode 11, can be obtained from the electrodes pad 17 and pad 19. Based on this signal, measurement pressure can be calculated.

Accordingly, since the gold-silicon eutectic crystal layer 16' is interposed between the contact layer 15 and the silicon substrate 13, that is, since the contact layer 15 and the silicon substrate 13 are electrically connected to each other by using a gold-silicon eutectic reaction at the time of bonding the silicon substrate 13 and the glass substrate 20, a contact resistance between the contact layer 15 and the silicon substrate 13 can be stabilized, a Q value of the sensor can be stabilized, and satisfactory sensor characteristics can be obtained. In addition, since the contact layer 15 and the silicon substrate 13 are bonded to each other by the gold-silicon eutectic reaction, the bonding strength is sufficient. Also, since the extraction electrode between the silicon substrate 13 having the diaphragm and the bonded area 20b does not exist, the bonding reliability between the diaphragm and the glass substrate 20 is improved, and the airtightness of the cavity 12 can be increased.

For the capacitive pressure sensor described above, a two-week promotion test (a pressure cooker test) is performed under the conditions of 100% RH, 2 atm (2026 hPa) pressure, 121° C. As a result, the contact resistance in the bonded area is several $\Omega$s, which is sufficiently low.

Second Embodiment

Figure 3:
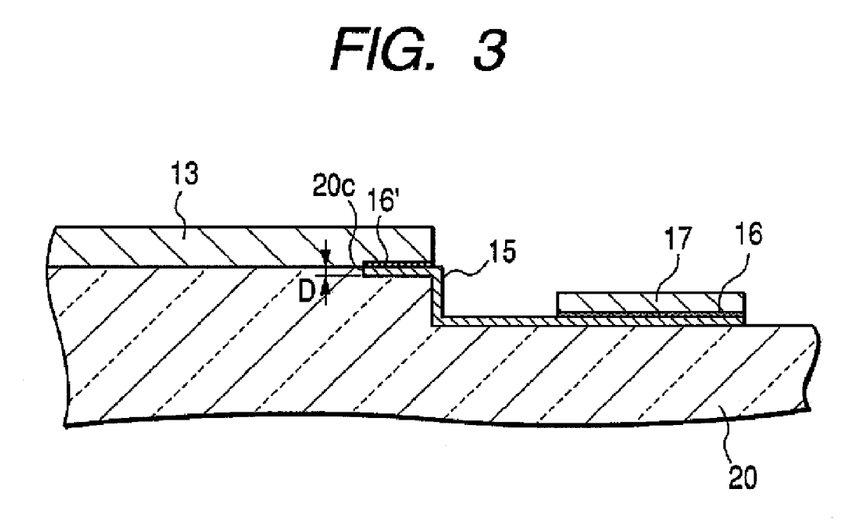
FIG. 3 is a schematic diagram illustrating a configuration of a capacitive pressure sensor according to a second embodiment of the invention.

FIG. 3 is a sectional view showing the schematic configuration of the capacitive pressure sensor according to a second embodiment of the present invention. In FIG. 3, the same elements as FIG. 1B are denoted by the same reference numerals as FIG. 1B and detailed description thereof will be omitted.

In the capacitive pressure sensor as shown in FIG. 3, the bonded area 20b has a recess portion 20c, and a contact layer 15 is formed in the recess portion 20c. According to the configuration, a thickness by the contact layer 15 can be accepted in the glass substrate 20, the silicon substrate 13 and the glass substrate 20 are properly bonded to each other. Specifically, a depth D of the recess portion 20c is set so that the glass substrate 20 and the contact layer 15 are flush with each other when the contact layer 15 is formed in the recess portion 20c. Accordingly, since the bonded area between the glass substrate 20 and the contact layer 15 can be flat, only a gold-seed layer 16 contributing to the gold-silicon eutectic crystal reaction can be allowed to protrude and accordingly, the gold-silicon eutectic crystal reaction can utilized. As a result, a bonding strength between the silicon substrate 13 and the glass substrate 20 can be increased.

Hereinafter, a manufacturing method of the capacitive pressure sensor according to the second embodiment of the invention will be described. FIGS. 4A to 4D are cross-sectional illustrating the manufacturing method of the capacitive pressure sensor according to the second embodiment of the invention.

At the time of manufacturing the capacitive pressure sensor according to the embodiment, identically with the first embodiment, a buried substrate is provided, the recess portion for a cavity is formed in the buried substrate and a fixed electrode is formed.

Figure 4A:
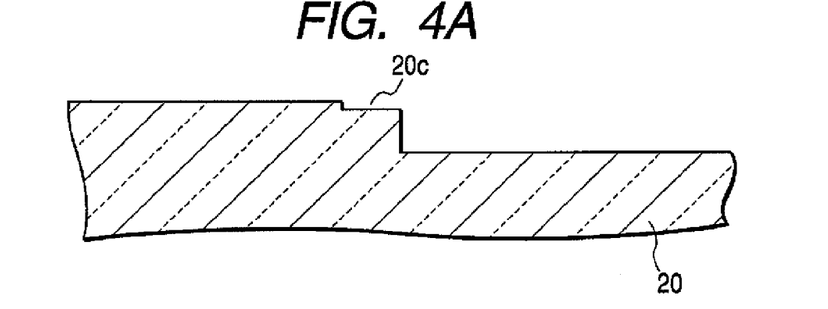
FIGS. 4A to 4D are sectional views illustrating a method of manufacturing a capacitive pressure sensor according to the second embodiment of the invention.

Accordingly, as shown in FIG. 4A, the recess portion 20c for the contact layer 15 is formed on the bonded area 20b of the glass substrate 20. In this case, a resist film is formed on the glass substrate 20 and patterned so that the resist film can remain on an area around the recess portion formation area. Accordingly, the resist film is employed as a mask, and a milling process is performed in the glass substrate 20. Thereafter, the remaining resist film is removed (lifted-off).

Figure 4B:
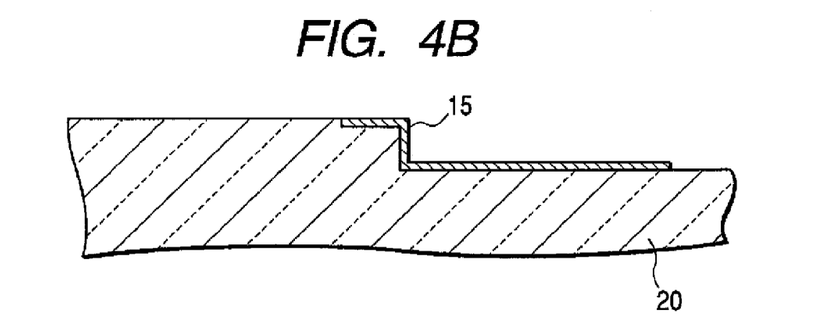

Accordingly, as shown in FIG. 4B, the contact layer 15 is formed from the electrode formation area 20a of the glass substrate 20 to the recess portion 20c of the bonded area 20b. In this case, the resist film is formed on the glass substrate 20 and is patterned to open the contact layer formation area. Accordingly, the material forming the contact layer 15 is deposited by a sputtering technique and the resist film removed.

Figure 4C:
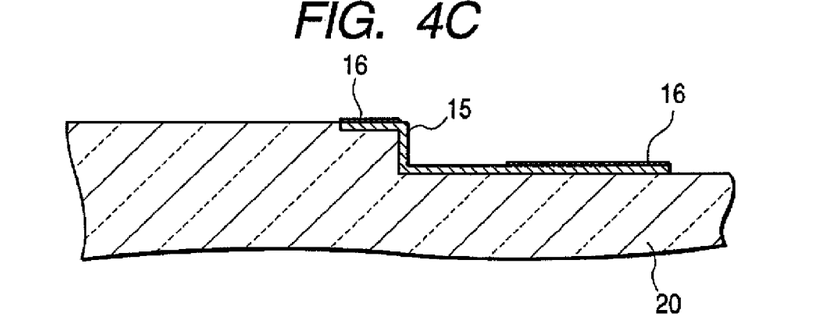

Accordingly, as shown in FIG. 4C, a gold-seed layer 16 is formed in a state where the gold-seed layer is separated from the contact layer 15. In this case, the resist film is formed in the area including the contact layer 15, the resist film is patterned to open the gold-seed layer formation area, the material (gold) forming the gold-seed layer 16 is deposited by sputtering technique and the like, and the resist film is removed (lifted-off). Therefore, an electrode pad 17 can be formed on the gold-seed layer 16 by plating.

Figure 4D:
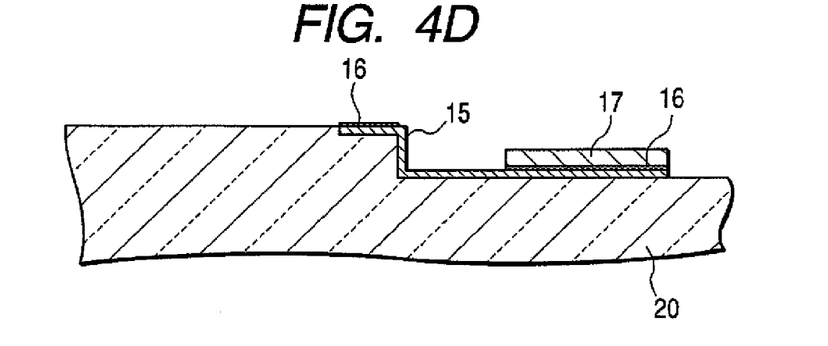

Accordingly, as shown in FIG. 4D, the electrode pad 17 is formed on the gold-seed layer 16. In this case, the mask is provided in the area around the electrode pad formation area, and the electrode pad 17 is formed by only the electrode pad formation area. Also, the condition of the plating is generally a used condition, although it may be varied according to the material. Accordingly, the resist film is formed on the entire surface and is patterned (photo-lithography) so that the resist film remains around the electrode pad. Accordingly, the resist film is employed as a mask to etch the gold-seed layer 16 and the contact layer 15. Thereafter, the remaining resist film is removed.

Accordingly, a silicon substrate 13, which is formed in a predetermined thickness of several tens micrometers by the etching or the grinding, is bonded on the glass substrate 20 by allowing the diaphragm (the movable electrode) to be placed at an interval of a predetermined gap. Accordingly, the anode bonding process is carried out by applying voltage of about 500 V to the silicon substrate 13 and the glass substrate 20, and heating the substrates at a temperature of 400° C. or less. The adhesion at the interface between the silicon substrate 13 and the glass substrate 20 is increased so that the airtightness of the cavity 12 can be improved. Accordingly, for the gold-seed layer 16 between the contact layer 15 and the silicon substrate 13 in the bonded area 20b, via the gold-silicon eutectic reaction of the gold of the gold-seed layer 16 and the silicon of the silicon substrate 13, is converted into the gold-silicon eutectic crystal layer 16'. Accordingly, the capacitive pressure sensor can be formed.

In the capacitive pressure sensor as described above, the fixed electrode 11 is electrically connected to the electrode pad 19 with contact pins 14 and pin 18 interposed therebetween and the diaphragm is electrically connected to the electrode pad 17 with the contact layer 15 interposed therebetween. Accordingly, the signal representing the variation of the electrostatic capacitance, which is sensed between the diaphragm and the fixed electrode 11, can be obtained from the electrodes pad 17 and pad 19. Based on this signal, measurement pressure can be calculated.

Accordingly, since the gold-silicon eutectic crystal layer 16' interposed between the contact layer 15 and the silicon substrate 13, that is, since the contact layer 15 and the silicon substrate 13 are electrically connected to each other by using a gold-silicon eutectic reaction at the time of bonding the silicon substrate 13 and the glass substrate 20, a contact resistance between the contact layer 15 and the silicon substrate 13 can be stabilized. Also, a Q value of the sensor can be stabilized, and satisfactory sensor characteristic can be obtained. In addition, since the contact layer 15 and the silicon substrate 13 are bonded to each other by the gold-silicon eutectic reaction, the bonding strength is sufficient. Also, since the extraction electrode between the silicon substrate 13 having the diaphragm and the bonded area 20b does not exist, the bonding reliability between the diaphragm and the glass substrate 20 is improved, and the airtightness of the cavity 12 can be increased.

Third Embodiment

Figure 6A:
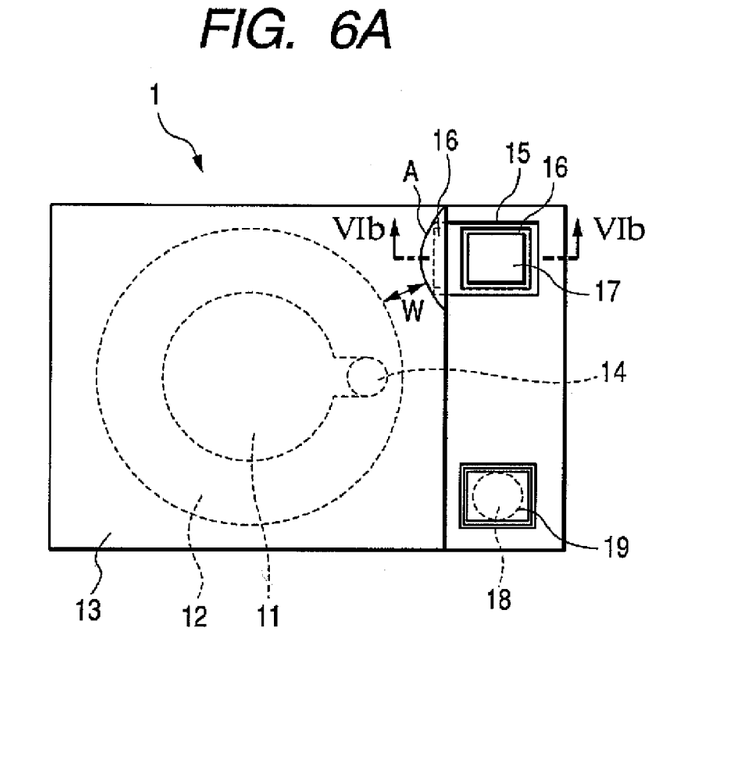
FIG. 6A is a plan view and FIG. 6B is a sectional view taken along Line IVb-IVb of FIG. 6A according to a third embodiment of the invention.
Figure 6B:
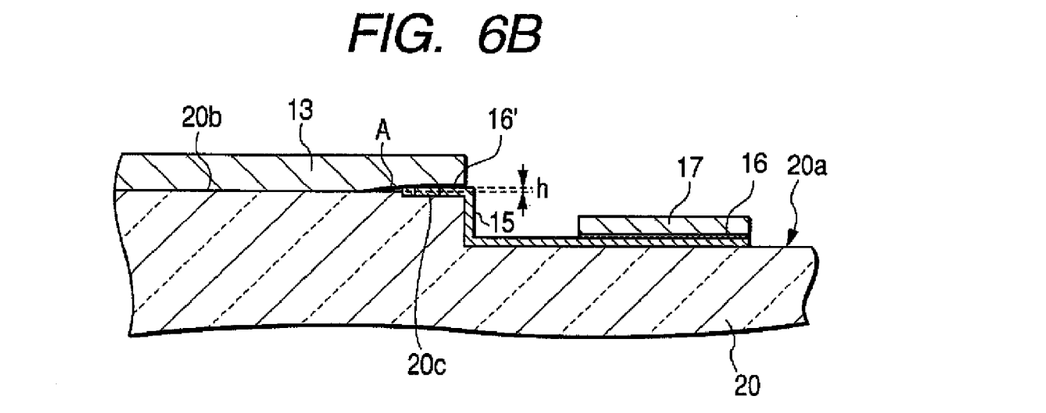

FIG. 6 is a cross-sectional view illustrating the schematic configuration of a capacitive pressure sensor according to the third embodiment of the invention. In FIG. 6, the same elements as shown in FIGS. 1A and 1B are denoted by the same reference numerals as shown in FIGS. 1A and 1B and detailed description thereof will be omitted.

The recess portion 20c is formed in the bonded area 20c of the glass substrate 20, and the contact layer 15 extends from the recess portion 20c to the electrode formation area 20a. Accordingly, the contact layer 15 is bonded to the silicon substrate 13 on the bonded area 20b, and the electrode pad 17 is formed on the electrode formation area 20a in an upper part. The silicon substrate 13 has the movable electrode electrically connected to the electrode pad 17 with the contact layer 15 interposed therebetween. The contact layer 15 is formed of a metal which has a good adhesion with glass such as Ti, Cu, Cr, TiAu, TiTa and so on, and is scattered on the silicon. In addition, it is preferable that a thickness of the contact layer 15 is in the range of 100 nm to 300 nm by utilizing electric conduction characteristics, a gold-silicon eutectic reaction, and anode junction characteristics, and so on.

The silicon substrate 13 is formed on the glass substrate 20 with the contact layer 15 interposed therebetween in the bonded area 20b. The gold-silicon eutectic crystal layer 16' is formed on the contact layer 15. The gold-silicon eutectic crystal layer 16' can be obtained at the time of bonding the silicon substrate 13 and the glass substrate 20. For example, in parallel with the anode bonding the eutectic reaction by a gold of the gold-seed layer 16 formed on the contact layer 15 and a silicon of the silicon substrate 13 effect the gold silicon eutectic silicon. The gold-silicon eutectic crystal layer 16' serves to prevent an oxidation in a surface of the contact layer 15.

The contact layer 15 protrudes from a position of the surface of the glass substrate 20 in the bonded area 20b. Due to the protrusion of the contact layer 15 from the surface of the glass substrate 20, when the glass substrate 20 and the silicon substrate 13 are pressed and bonded to each other, the gold-seed layer and the silicon substrate 13 are properly bonded and the gold-silicon eutectic reaction can occur. That is, when the glass substrate 20 is bonded to the silicon substrate 13, by preventing a gap between the gold of the gold-seed layer and the silicon substrate 13, so it can contribute to the gold-silicon eutectic crystal reaction efficiently. The protrusion height h of the contact layer 15 is about 3,000 Å or less, preferably in the range of 300 Å to 3,000 Å.

Accordingly, since the gold-silicon eutectic crystal layer 16' is interposed between the contact layer 15 and the silicon substrate 13, that is, since the contact layer 15 and the silicon substrate 13 are electrically connected to each other by using a gold-silicon eutectic reaction at the time of bonding the silicon substrate 13 and the glass substrate 20, a contact resistance between the contact layer 15 and the silicon substrate 13 can be stabilized, a Q value of the sensor can be stabilized, and satisfactory sensor characteristics can be obtained. In addition, since the contact layer 15 and the silicon substrate 13 are bonded to each other by the gold-silicon eutectic reaction, the bonding strength is sufficient.

By protruding the contact layer 15 from the surface of the glass substrate 13, a non-bonded area A is created between the glass substrate 20 and the silicon substrate 13 near the contact layer 15. The distance W from an outer end portion of the non-bonded area A to the end portion of the cavity 12 is about 150 μm or more, preferably in the range of 150 μm to 310 μm. The bonding between the silicon substrate 13 and the glass substrate 20 is sufficient, the movable electrode is sufficiently varied by the pressure.

Figure 7A:
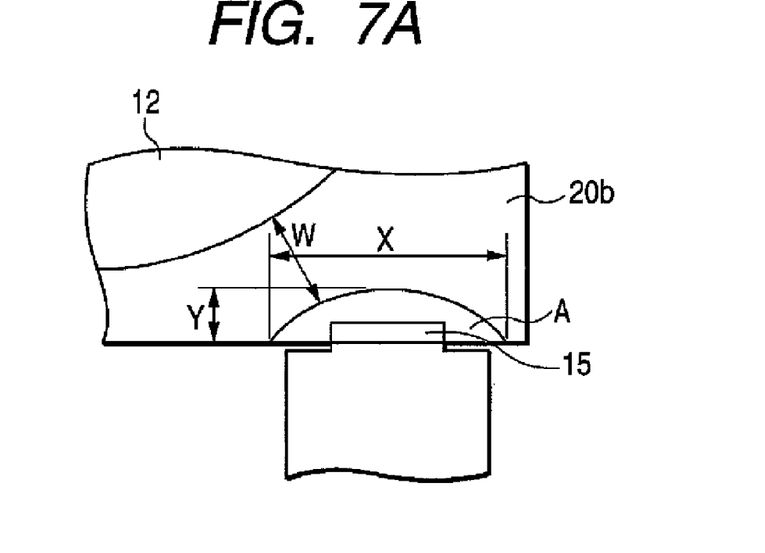
FIG. 7A is a diagram illustrating a non-bonded area of a capacitive pressure sensor according to the third embodiment of the invention.
Figure 7B:
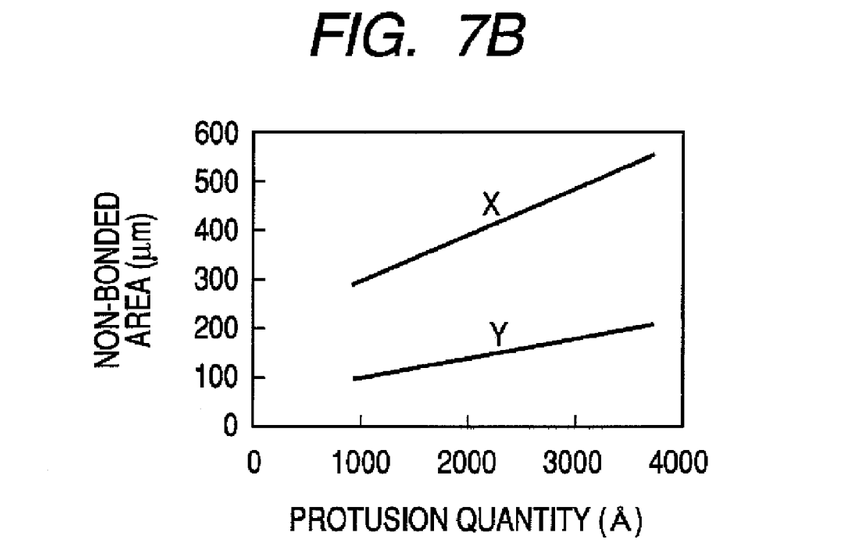
FIG. 7B is a diagram illustrating a relationship between a thickness of a contact layer and the non-bonded area.

Recognizing the relationship between the protrusion height h of the contact layer 15 and the non-bonded area A, inventors examined the relationship between the protrusion height of the contact layer 15 and the non-bonded area A. That is, as shown in FIG. 7A, the inventors examined the relationship between the protrusion height h of the contact layer 15 in the bonded area 20b and the distance in the direction of X(X) and the distance in the direction of Y(Y) in the non-bonded area A. As a result, as shown in FIG. 7B, as the protrusion height h of the contact layer 15 increases, the distance to the direction of X(X) and the distance to the direction of Y(Y) in the non-bonded area A increase. In other words, as the protrusion height h of the contact layer 15 increases, the distance W from the outer end portion of the non-bonded area A to the end portion of a cavity 12 decreases. Accordingly, when the protrusion height h of the contact layer 15 and distance W are optimized, the bonding between the glass substrate 20 and the silicon substrate 13 is adequate, which in part, is the motivation underlying the present invention. In other words, the objection of the present invention is that the bonding of substrates can be assured by optimizing the protrusion height of the contact layer 15 and distance W even when the extraction electrode exists between substrates in the bonded area.

The gold-seed layer 16 is formed on the contact layer 15 of the electrode formation area 20a. The gold-seed layer 16 serves as a plating seed layer. A material forming the seed layer can be varied appropriately by the material forming the electrode pad on the seed layer by considering the contact resistance. An electrode pad 17 is formed on the gold-seed layer 16. The electrode pad 17 can be connected to an external circuit electrically by connecting means such as a wire bonding, and so on. Forming the electrode pad 17 is determined depending upon the materials forming the seed layer and for materials forming the electrode pad 17. The structure of the electrode formation area is not limited to that shown and other structures may be used.

It is preferable that an interface between the silicon substrate 13 and the glass substrate 20 had the high adhesion. At the time of bonding the silicon substrate 13 to the glass substrate 20, the adhesion can be increased between the substrates 13 and 20 by mounting the silicon substrate 13 in the anode bonding manner on a bonded surface of the glass substrate 20. Accordingly, airtightness in the cavity 12 can be enhanced by exhibiting high adhesion on the interface between the glass substrate 20 and the silicon substrate 13.

Herein, an anode bond process is used where a large electrostatic attraction between the silicon and the glass is created by applying a predetermined voltage (for example, 300 V~1 kV) at a predetermined temperature (for example, 400° C. or less). A chemical bond where oxygen is interposed on a contacted glass-silicon interface is formed, or a covalent bond where oxygen is emitted, is formed. The covalent bond on the interface is a Si—Si bond or a Si—O bond which is included in a Si atom of the silicon and the glass between Si atoms. Accordingly, the silicon and the glass are bonded strongly by the Si—Si bond, or the Si—O bond, and a high adhesion is exhibited in the interface. In order to perform such an anode bonding efficiently, it is preferable that a glass material of the glass substrate 20 includes an alkali metal such as sodium, and the like (e.g., Pyrex glass, which is a Registered Trademark of Corning Glass Corporation).

The capacitive pressure sensor having such a configuration includes a predetermined electrostatic capacitance between the diaphragm, which is the movable electrode, and the fixed electrode 11. When pressure is applied to the pressure sensor, the diaphragm is movable by the pressure. Accordingly, the diaphragm is shifted. At this time, the electrostatic capacitance between the diaphragm and the fixed electrode 11 varies. Accordingly, the variation can be converted into a pressure variation by using the electrostatic capacitance as a parameter.

Next, a method of manufacturing the capacitive pressure sensor will be described. FIGS. 2A to 2C are sectional views illustrating the method of manufacturing the capacitive pressure sensor according to the first embodiment.

During manufacture, a buried substrate burying a conductive portion of the silicon to the glass substrate, and a recess portion is formed in the buried substrate for the cavity and the fixed electrode, is formed. Specifically, a protrusion portion is formed by etching a main direction of the silicon substrate, which is subjected to a low resistance. The glass substrate is placed in the protrusion portion, the silicon substrate or the glass substrate is heated in a vacuum, the silicon substrate is pressed on the glass substrate, the protrusion portion is pressed into the glass substrate, and then the silicon substrate and the glass substrate are bonded to each other. By performing a grinding process of the glass substrate and the silicon substrate, and exposing the protrusion portion in both side of the glass substrate, the buried substrate is manufactured in which the conductive portion is buried in the glass substrate. Then, the fixed electrode is formed by forming the recess portion for the cavity in the buried substrate.

Figure 8A:
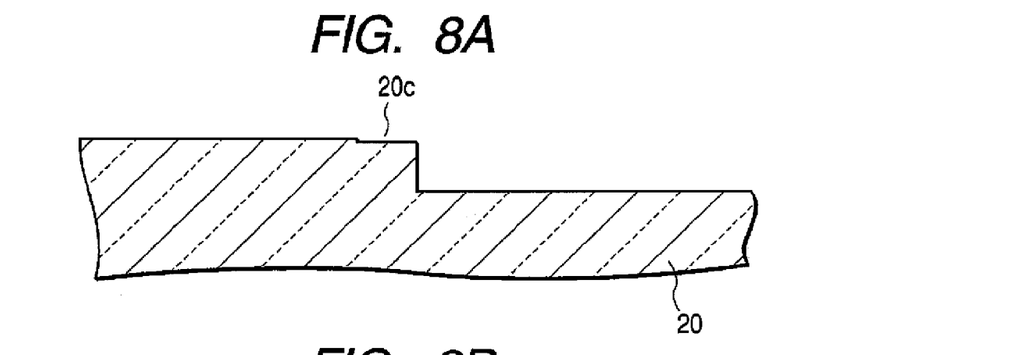
FIGS. 8A to 8D are sectional views illustrating a method of manufacturing a capacitive pressure sensor according to the third embodiment of the invention.

Accordingly, as shown in FIG. 8A, the recess portion 20c for a contact layer 15 is formed in the bonded area 20b of the glass substrate 20. In this case, the resist film is formed on the glass substrate 20 and is patterned so that the resist film remains on the area around the recess portion formation area. The resist film is employed as a mask and a milling process is performed on the glass substrate 20. Thereafter, the remaining resist film is removed. The height of the contact layer 15 protruding from the surface of the glass substrate 20 is about 3000 Å or less.

Figure 8B:
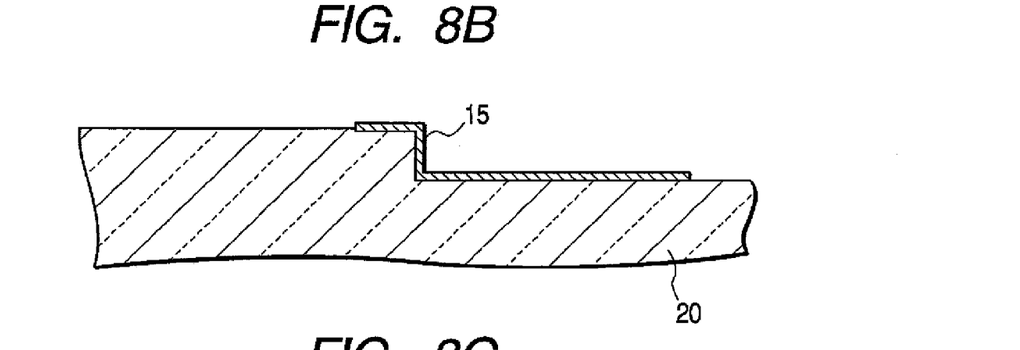

As shown in FIG. 8B, from the electrode formation area 20a of the glass substrate 20 to the recess portion of the bonded area 20b, the contact layer 15 is formed along the bump. Accordingly, a resist film is formed on the glass substrate 20 and the resist film is patterned to open the contact layer formation area. A material forming the contact layer 15 is deposited by a sputtering technique, and so on, and the resist film is removed (lifted off).

Figure 8C:
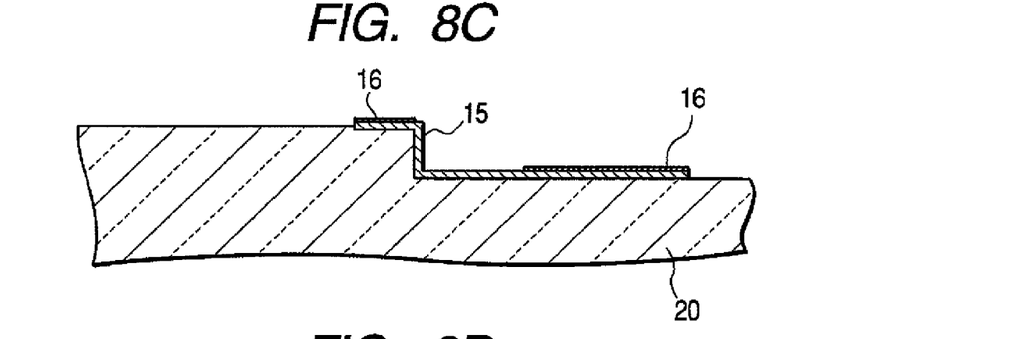

Accordingly, as shown in FIG. 8C, the gold-seed layer 16 is formed in a state where the gold-seed layer 16 is separated from the contact layer 15. In this case, the resist film is formed in the area including the contact layer 15, and the resist film is patterned to open the gold-seed layer formation area. The material forming the gold-seed layer 16 is deposited by the sputtering technique, and so on and the resist film is removed (lifted off). Accordingly, the electrode pad 17 is formed on the gold-seed layer 16 by the plating.

Figure 8D:
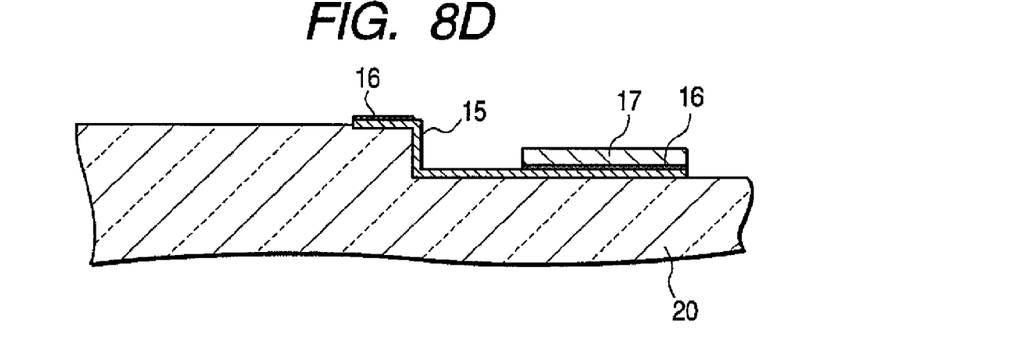

Accordingly, as shown in FIG. 8D, an electrode pad 17 is formed on a gold-seed layer 16. In this case, a mask is provided on an area around the electrode pad formation area and only the electrode pad formation area is plated to form an electrode pad 17. Also, a condition of the plating is generally a used condition although the condition may be vary according to material. Accordingly, the resist film is formed on the entire surface and patterned (photo-lithography) so that the resist film remains around the electrode pad. Accordingly, the resist film is employed as the mask to etch the gold-seed layer 16 and the contact layer 15. Accordingly, the remaining resist film is removed.

Accordingly, a silicon substrate 13 which is formed in a predetermined thickness of several tens of micrometers by etching or grinding, is bonded on the glass substrate 20 by allowing the diaphragm (the movable electrode) to be placed at an interval of a predetermined gap. Accordingly, the anode bonding process is carried out by applying voltage of about 500 V to the silicon substrate 13 and the glass substrate 20, and heating the substrates at a temperature of 400° C. or less. The adhesion at the interface between the silicon substrate 13 and the glass substrate 20 is increased so that the airtightness of the cavity 12 can be improved. Accordingly, for the gold-seed layer 16 between the contact layer 15 and the silicon substrate 13 in the bonded area 20b, via the gold-silicon eutectic reaction of the gold of the gold-seed layer 16 and the silicon of the silicon substrate 13, is converted into the gold-silicon eutectic crystal layer 16'. Accordingly, the capacitive pressure sensor can be produced. At this time, a distance from the outer end portion of the non-bonded area A in the bonded area 20b to the end of the cavity 12 is about 150 μm or more.

In the capacitive pressure sensor, which has been obtained from the above-mentioned process, the fixed electrode 11 is electrically connected to the electrode pad 19 with contact pins 14 and pin 18 interposed therebetween and the diaphragm is electrically connected to the electrode pad 17 with the contact layer 15 interposed therebetween. Accordingly, the variation of the electrostatic capacitance, which is sensed between the diaphragm and the fixed electrode 11, can be obtained from the electrodes pad 17 and pad 19. Based on this signal, measurement pressure can be calculated.

This capacitive pressure sensor optimizes the protrusion height h of the contact layer 15 in the bonded area 20b and the distance W from the outer end portion of the non-bonded area A in the bonded area 20b to the end portion of the cavity 12. That is, since the distance W from the outer end of the non-bonded area A existing in the bonded area 20b to the end portion of the cavity 12 is about 150 μm or more, and the protrusion height h of the contact layer from the surface of the glass substrate 20 is about 3,000 Å or less, the substrates are bonded even when the extraction electrode existed in the bonded area between substrates, thereby providing satisfactory sensor characteristics. Accordingly, since the gold-silicon eutectic crystal layer 16' is interposed between the contact layer 15 and the silicon substrate 13, that is, since the contact layer 15 and the silicon substrate 13 are electrically connected to each other by using a gold-silicon eutectic reaction at the time of bonding the silicon substrate 13 and the glass substrate 20, a contact resistance between the contact layer 15 and the silicon substrate 13 can be stabilized, a Q value of the sensor can be stabilized, ad satisfactory sensor characteristics can be obtained. In addition, since the contact layer 15 and the silicon substrate 13 are bonded to each other by the gold-silicon eutectic reaction, the bonding strength is sufficient. Also, since the extraction electrode between the silicon substrate 13 having the diaphragm and the bonded area 20b does not exist, the bonding reliability between the diaphragm and the glass substrate 20 is improved, and the airtightness of the cavity 12 can be increased.

Hereinafter, in the capacitive pressure sensor, the optimization values of the protrusion height h of the contact layer 15 in the bonded area 20b, and the distance W from the outer end portion of the non-bonded area A to the end portion of the cavity 12, will be described. After varying the protrusion height (h) of the contact layer 15, eight types of the capacitive pressure sensor of which their distances (a sealing width) W are different from each other. Accordingly, for the capacitive pressure sensor, a capacity evaluation test and ESR (equivalent serial resistor) evaluation are carried out. The results will be shown in a table 1 below. As to the eight types of the capacitive pressure sensors, when the protrusion height (h) of the contact layer 15 is set as 4200 Å, 3800 Å, 3500 Å, 3000 Å, 1300 Å, 700 Å, 300 Å and 0 Å each, the sealing width (W) is 60 µm, 100 µm, 120 µm, 150 µm, 250 µm, 285 µm, 310 µm, and 330 µm respectively. Also, each evaluation was performed for 10 samples of each type of the capacity pressure sensor.

The capacitance evaluation was performed by examining whether or not there is any variation in electrostatic by applying pressure 1~5 Pa (100 kPa~500 kPa) to a capacitive pressure sensor by using a LCR meter 4275A. The case where there is any change in every 10 sample is marked by o; the case where there is any change in 8 samples or more is marked by O; and other cases are marked by X.

The ESR evaluation was performed by examining resistances except the capacitance and the inductance by using the LCR meter 4185A. The case where 10 samples have ESR of 4 Ω or less is marked by o, the case where 8 samples have ESR of 4 Ω or less is marked by o, and the other cases are marked by X.

As to the reliability test, we performed a pressure cookery test exposing the samples under the atmosphere of 2 atm (2026 hPa), 121° C. 100% humidity for 192 hours, and then put the samples at a temperature of -40° C. for 2 hours and decreased the temperature from 120° C. to -40° C. for 2 hours. A total of 45 cycles were carried out. Accordingly, a temperature cycle test putting the samples under the atmosphere of 25° C.±15° C. for 2 hours was carried out.

TABLE 1

| PROTRUSION HEIGHT(H) | SEALING WIDTH(W) | BEFORE RELIABILITY TEST | | AFTER RELIABILITY TEST | |
|---|---|---|---|---|---|
| | | CAPACITY EVALUATION | ESR EVALUATION | CAPACITY EVALUATION | ESR EVALUATION |
| 4200 Å | 60 µm | o | o | X | X |
| 3800 Å | 100 µm | o | o | X | X |
| 3500 Å | 120 µm | o | o | X | o |
| 3000 Å | 150 µm | o | o | o | o |
| 1300 Å | 250 µm | o | o | o | o |
| 700 Å | 285 µm | o | o | o | o |
| 300 Å | 310 µm | o | o | O | O |
| 0 Å | 330 µm | X | X | X | X |

As shown in Table 1, the optimization values of the protrusion height h of the contact layer 15 in the bonded area 20b, and the distance W from the outer end portion of the non-bonded area A to the end portion of the cavity 12 in the bonded area 20b, are as follows: a protrusion height (h) is about 3,000 Å or less; and a sealing width (W) is about 150 µm or more. In addition, it is considered that the ESR of the samples having the protrusion heights of 4200 Å and 3800 Å is x, because a connection failure, a broken wire, or a corrosion occurs due to breakage of the sealing of the cavity 12. In addition, for the sample with a protrusion height of 0 Å, the cavity 12 could be sealed. However, since no gold-silicon eutectic crystal layer or only a part of the gold-silicon eutectic crystal layer 16' is formed between the diaphragm and the contact layer 15, it could not possible to ensure an electric conduction of the diaphragm and the contact layer 15.

The present invention is not limited only to embodiments 1, 2 and 3. Various modifications may be made to the described embodiments. For example, there are no particular limitations to the structure and configuration of the capacitive pressure sensor only when it is made by the bonding of the glass substrate having the fixed electrode and the silicon substrate having the movable electrode. Also, there are no particular limitations to values or materials mentioned in the embodiments 1, 2 and 3. Furthermore, etching or milling process is performed with the generally used conditions in the embodiments 1, 2 and 3. Also, the processes are not limited only to the above-mentioned embodiments, but proper exchange of an order of steps taken is possible in the processes. Other modifications are also possible without departing from the scope of the objection of the present invention.

The present invention can be applied, for example, to a barometer monitoring an atmospheric pressure or a capacitive pressure sensor monitoring gas pressure.

What is claimed is:

1. A capacitive pressure sensor comprising:
   a glass substrate having a fixed electrode;
   a silicon substrate having a movable electrode;
   a bonded area between the glass substrate and the silicon substrate;
   an extraction electrode formation area on the glass substrate for the movable electrode;

a contact layer extending from the bonded area to the extraction electrode formation area; and a gold-silicon eutectic crystal layer provided between the contact layer and the silicon substrate in the bonded area.

2. The capacitive pressure sensor according to claim 1, wherein the bonded area includes a recess portion and the contact layer is formed in the recess portion.

3. The capacitive pressure sensor according to claim 2, wherein a depth of the recess portion is set so that the glass substrate and the contact layer are flush with each other at the time of forming the contact layer in the recess portion.

4. The capacitive pressure sensor according to claim 1, wherein a gold layer is formed on the extraction electrode formation area of the contact layer in a state where the gold layer is separated from the gold-silicon eutectic crystal layer.

5. The capacitive pressure sensor according to claim 1, wherein a distance from an outer end portion of a non-bonded area which is formed in the bonded area to an end portion of a cavity is 150 μm or more and a height of the contact layer protruding from a surface of the glass substrate is 3000 Å or less.

6. The capacitive pressure sensor according to claim 5, wherein the bonded area has a recess portion and the contact layer is formed in the recess portion.

7. The capacitive pressure sensor according to claim 5, wherein an interface between the glass substrate and the silicon substrate has one of a Si-Si bond or a Si-O bond.

* * * * *